No. 753,069. PATENTED FEB. 23, 1904.
H. J. HAYS.
APPARATUS FOR FORMING PLATE GLASS.
APPLICATION FILED MAY 2, 1903.
NO MODEL.
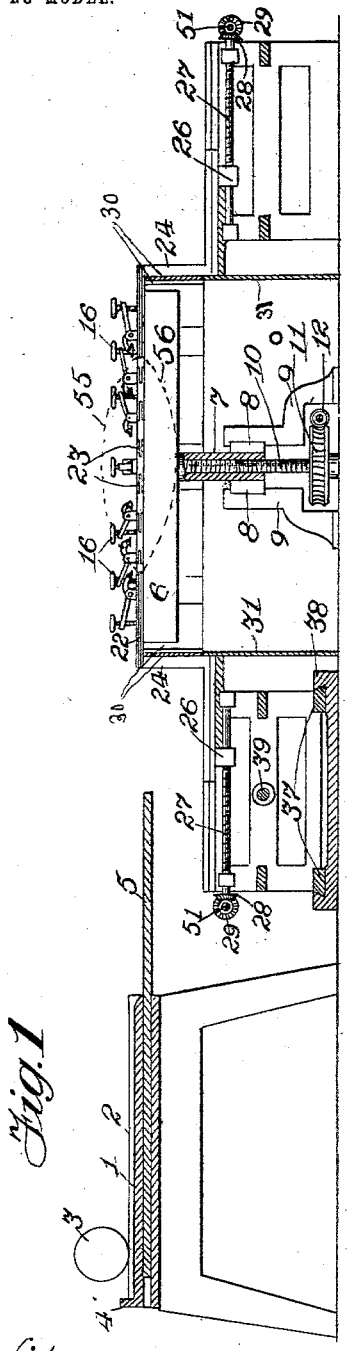
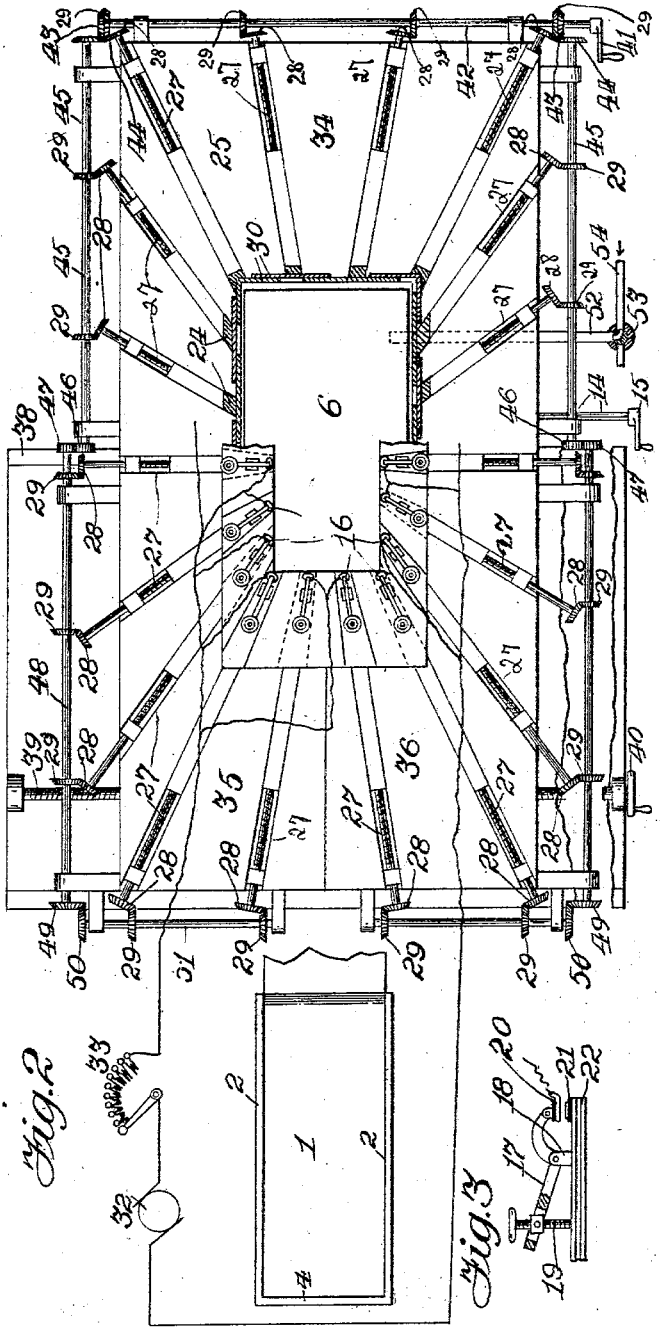
Witnesses:
Geo B Rowley
E. E. Potter
Inventor:
H. J. Hays.
By H. C. Evert
Attorneys No. 753,069.

Patented February 23, 1904.

UNITED STATES PATENT OFFICE.

HARRY JACOB HAYS, OF PITTSBURG, PENNSYLVANIA, ASSIGNOR TO EDWARD F. HAYS, TRUSTEE, OF PITTSBURG, PENNSYLVANIA.

APPARATUS FOR FORMING PLATE-GLASS.

SPECIFICATION forming part of Letters Patent No. 753,069, dated February 23, 1904.

Application filed May 2, 1903. Serial No. 155,303. (No model.)

*To all whom it may concern:*

Be it known that I, HARRY JACOB HAYS, a citizen of the United States of America, residing at Pittsburg, in the county of Allegheny and State of Pennsylvania, have invented certain new and useful Improvements in Apparatus for Forming Plate-Glass, of which the following is a specification, reference being had therein to the accompanying drawings.

This invention relates to certain new and useful improvements in apparatus for forming sheet or plate glass, the object being to so form the glass that the same is of an even thickness and is of uniform and equal quality.

A further object of this invention is to so form the glass that the surface thereof will be uniformly smooth and that the same will be clear and transparent, and in carrying out the invention the apparatus used therefor is simple and easily handled and effective in operation.

In describing the invention in detail reference is had to the accompanying drawings, forming a part of this specification, and wherein like numerals of reference indicate like parts throughout the several views, in which—

Figure 1 is a sectional elevation of my apparatus for forming sheet or plate glass. Fig. 2 is a plan view thereof, partly in section. Fig. 3 is a detail of the clamp and electrical connection for gripping the edge of the glass.

The heated glass is first laid on the receiving-table 1, having the ledges 2 2 at the side thereof, said ledges being of such height that the roller 3 passing over the same will roll out the plates of glass to a predetermined thickness, and the ledge 4 at the rear of the table confines the rear edge of said glass and also forms a stop for the roller 3. The glass in being rolled out on this table will thus be forced forwardly, and when the rolling operation has been completed the telescoping table 5, which is mounted on the under side of the table 1, is moved forward, over which a piece of glass may be dragged to the stretching apparatus. This stretching and reheating apparatus consists of a table 6, having a stem 7, on which guides 8 8, sliding upon supports 9 9, are mounted, and a vertical spindle 10, which is screw-threaded and engages the interior of the stem 7, has mounted on its lower end the worm-gear 11, with which the worm 12 meshes, and a shaft 14, on the outer end of which a handle 15 is placed, is adapted to be revolved, thereby providing a means for raising or lowering the table 6.

Located around the upper side of the table 6 are a series of clamps 16, which consist of a lever 17, which is pivoted in the bifurcated lug 18, said lever at its outside end being provided with a hand-wheel and elevating-screw 19, which is adapted to raise the rear end of said lever 17, thereby forcing the forward end of the same downward, and said forward end carries an insulated block or contact-piece 20, which is adapted to engage and hold the piece of glass. A block of insulation 21 is provided underneath said block 20 to properly insulate the glass. The other block or contact-piece, 21, on slide 22 is similarly insulated. Each one of these clamps is mounted on a separate slide, and said slides are so formed that the engaging edges are fitted one into the other, as indicated at 23, whereby when the clamps are moved away from the center of the table an unbroken connection is still maintained between said plates 22, on which the clamps are mounted. Each of these plates 22 is mounted on a separate vertical support 24, the lower end of which is formed with a slide and operates in the bed-piece 25, which encircles the table 6. The slide portions of the vertical supports 24 have formed on their under sides lugs 26, which project through said bed-piece 25 and are engaged by the screw-threaded spindles 27, mounted below the said bed-piece, and the outer ends of the several spindles 27 have provided thereon gears 28, which are in mesh with gears 29, mounted on suitable shafts. The vertical supports 24 are provided on their edges nearest the table 6 with plates 30, which overlap each other, and the vertical wall 31, secured below said vertical supports 24 within the bed-piece 25, is provided. By using this wall 31, plates 30, and slides 22 the table 6 will be inclosed in a chamber formed thereby, this being for a purpose to be hereinafter more fully described. A dynamo or other suitable source of electrical current 32 is provided, one terminal of which leads to half of the blocks 20 and the other terminal of which leads to the other half thereof through a suitable resistance 33, provided in the circuit. It is preferable that these two terminals of the source of current should lead, respectively, to the blocks 20, which are oppositely disposed around the table 6, as the purpose of these electrical connections is to connect the current with the piece of glass which will be held by these clamps, the internal resistance of said glass being such that the glass is heated while the same is being worked, and by disposing these terminals oppositely the heat will be better maintained throughout the piece of glass, although the connections might be disposed otherwise. In order that the glass may be removed from the table 5 to the table 6, it is necessary to remove the clamps over the end of the table 6 in order that the glass may be slid onto said table from the extension 5, and to do this I preferably form the bed-piece 25 in three parts 34 35 36, the part 34 being suitably secured to the floor and encircling the half of the table on the side away from the extension 5. The parts or sections 35 36 have slides 37 provided on their lower side, which operate in ways 38, and a shaft 39, the opposite ends of which are provided with right and left hand threads, engages suitable lugs formed on the under side of said sections, and the revolution of said shaft by the hand-wheel 40 will cause said sections to be separated, carrying with them the clamps and their connections, thereby offering an unobstructed passage for the piece of glass to the table 6. The operation of these clamps 16 is accomplished by the rotation of the operating-handle 41, which is provided on the end of the shaft 42 running across one end of the table, this shaft 42 having mounted thereon gears 29, which mesh with the gears 28, and the outer ends of said shaft carries gears 43, which mesh with gears 44 on the shafts 45, which extend along either side of the bed-piece to the point where the same is separated and the parts 35 36 begin. These shafts 45 are also provided with gears 29, and the ends of said shafts have gears 46 46, which when the parts 35 36 are in operative position engage gears 47 47, carried by the shafts 48 48, the other ends of said shafts having gears 49 49, which engage the gears 50 50, mounted on the shafts 51 51. These shafts 48 and 51 are also provided with gears 29, and all of said shafts are mounted in suitable bearings upon the different portions of the bed-piece.

After the glass has been placed upon the table 6 it will be gripped and held by the clamps 16, and the electrical current will be passed through said glass in order that the same may be heated and retained in a pliable condition by the heat caused by said current passing through the glass. As before described, the table 6 is mounted in a chamber, and a pipe 52 leads into said chamber and is connected by a three-way valve 53 with the pipe 54, leading from the air-supply. The glass being in position, as just described, the air is permitted to enter said chamber, thereby blowing the glass into position indicated by dotted lines 55 in Fig. 1. When the glass has been forced upwardly, the table 6 is lowered by the mechanism described therefor, and the air is allowed to exhaust from said chamber, when the glass will take the form shown by dotted lines 56 in Fig. 1. It will be seen that the glass may thus be stretched by the blowing process or by permitting the same to sag at its center by gravity or by moving the clamps away from the several sides of the table. During this operation the glass will be reheated by the electrical current and will be supported in any desired position by the air-cushion which is beneath it, thus any unevenness or roughness which might have been on its surface would be removed, and the surface of the glass will not be permitted to touch anything but the air until such time as it is sufficiently cooled when the table 6 will be elevated and the glass will rest thereon. The placing of the clamps around the said table and the apparatus for operating the same is such that any desired movement of the same may be obtained.

It will be noted that various changes may be made in the details of construction without departing from the general spirit of my invention.

Having fully described my invention, what I claim as new, and desire to secure by Letters Patent, is—

1. In an apparatus for forming sheet or plate glass, the combination of an adjustable table, a chamber surrounding said table, means for holding a sheet of glass over said chamber, electrical means connected therewith for heating said glass, and an air-supply means connected with said chamber, substantially as described.

2. In an apparatus for forming sheet or plate glass, the combination of an adjustable table, a chamber in which said table operates, a plurality of adjustable clamps above said table for holding a piece of glass, means connected with said clamps for electrically heating said glass, a supply means for fluid-pressure connected with said chamber, substantially as described.

3. In an apparatus for forming glass, the combination of an adjustable table, a chamber in which said table operates, a plurality of clamps above said table for holding a piece of glass, means to produce an electrical current of variable strength connected with said glass for reheating the same, and a supply means for fluid-pressure connected with said chamber, substantially as described.

4. In an apparatus of the character described, the combination of an adjustable table, a chamber in which said table operates, a plurality of adjustable clamps above said table for holding a piece of glass, means electrically connected with said clamps for electrically heating said glass, means for imparting a relative horizontal movement to said clamps, and a supply means for fluid-pressure connected with said chamber, substantially as described.

5. In an apparatus of the character described, the combination of a vertically-adjustable table, means for moving said table vertically, a receiving-table located adjacent to said vertically-movable table, a telescoping slide adapted to connect said tables, a plurality of clamps located above said vertically-movable table, slides on which said clamps are mounted, means for imparting a relatively-horizontal movement to said clamps, and electrical means connected to said clamps, substantially as described.

6. In an apparatus of the character described, the combination of a vertically-adjustable table, means for moving said table vertically, a receiving-table located adjacent to said vertically-movable table, a telescoping slide adapted to connect said tables, a plurality of clamps located above said vertically-movable table, slides on which said clamps are mounted, a sectional bed-piece in which said slides operate, and means for moving said sections relatively, means for imparting a relative horizontal movement to said clamps independent of said sections, and a source of electrical energy the terminals of which connect with the several clamps.

7. In a device of the type set forth, the combination with a vertically-movable table, a receiving-table, slidable clamps located above said vertical table, slides supporting said clamps, electrical conducting means secured to said clamps, and a source of electrical supply connected therewith, substantially as described.

8. In an apparatus of the character described the combination with an adjustable table, of a plurality of clamps for holding a piece of glass thereon, said clamps being insulated from said glass, contact-pieces carried by the clamps, electrical supply means in circuit therewith, and means for moving said clamps, substantially as described.

9. An apparatus of the character set forth, comprising an adjustable table, a chamber surrounding the same, an air-supply means for said chamber, a plurality of clamps, slidable supporting means therefor, means for simultaneously moving said clamps, insulating means carried by said clamps, contact means secured to each of said clamps for engagement with the glass, and a source of electrical supply operatively connected with said last-named means, substantially as described.

10. In an apparatus of the type set forth the combination with an adjustable table, of a series of slidable clamps, slides supporting the same, sectional means carrying said slides, means for moving said sections relatively, and electrical supply means connected with said clamps for heating glass carried by the table, substantially as described.

In testimony whereof I affix my signature in the presence of two witnesses.

HARRY JACOB HAYS.

Witnesses:
H. C. EVERT,
A. M. WILSON.